United States Patent
Sakezles

(10) Patent No.: US 7,427,199 B2
(45) Date of Patent: Sep. 23, 2008

(54) MODELS AND METHODS OF USING SAME FOR TESTING MEDICAL DEVICES

(76) Inventor: Christopher Sakezles, 500 Trinity La., Apt. 7202, St. Petersberg, FL (US) 33716

( * ) Notice: Subject to any disclaimer, the term of this patent is extended or adjusted under 35 U.S.C. 154(b) by 352 days.

(21) Appl. No.: 11/050,161

(22) Filed: Feb. 3, 2005

(65) Prior Publication Data

US 2006/0184005 A1    Aug. 17, 2006

(51) Int. Cl.
 *G09B 23/28* (2006.01)
(52) U.S. Cl. ..................................... 434/267
(58) Field of Classification Search ............. 434/262, 434/267, 268, 270, 271, 272, 273, 274
See application file for complete search history.

(56) References Cited

U.S. PATENT DOCUMENTS

| | | | | |
|---|---|---|---|---|
| 5,908,302 A * | 6/1999 | Goldfarb | ............ | 434/262 |
| 5,947,744 A * | 9/1999 | Izzat | ............ | 434/272 |
| 6,062,866 A * | 5/2000 | Prom | ............ | 434/268 |
| 6,474,993 B1 * | 11/2002 | Grund et al. | ............ | 434/262 |
| 6,488,507 B1 * | 12/2002 | Stoloff et al. | ............ | 434/272 |
| 6,511,325 B1 * | 1/2003 | Lalka et al. | ............ | 434/272 |
| 6,589,057 B1 * | 7/2003 | Keenan et al. | ............ | 434/271 |
| 6,773,263 B2 * | 8/2004 | Nicholls et al. | ............ | 434/267 |
| 6,780,016 B1 | 8/2004 | Toly | | |
| 6,887,082 B2 * | 5/2005 | Shun | ............ | 434/267 |
| 6,939,138 B2 * | 9/2005 | Chosack et al. | ............ | 434/262 |
| 7,008,232 B2 * | 3/2006 | Brassel | ............ | 434/268 |
| 7,191,110 B1 * | 3/2007 | Charbel et al. | ............ | 703/11 |
| 2004/0009459 A1 * | 1/2004 | Anderson et al. | ............ | 434/262 |
| 2004/0118224 A1 | 6/2004 | Tate et al. | | |
| 2004/0234933 A1 | 11/2004 | Dawson et al. | | |

OTHER PUBLICATIONS

How to Meet the New Simulation Testing Requirements, Medical Device & Diagnostic Industry Magazine, MDDI Article Index, Mar. 1998.

* cited by examiner

*Primary Examiner*—Kurt Fernstrom
(74) *Attorney, Agent, or Firm*—Beusse Wolter Sanks Mora & Maire

(57) ABSTRACT

Disclosed herein are synthetic anatomical models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

13 Claims, 8 Drawing Sheets

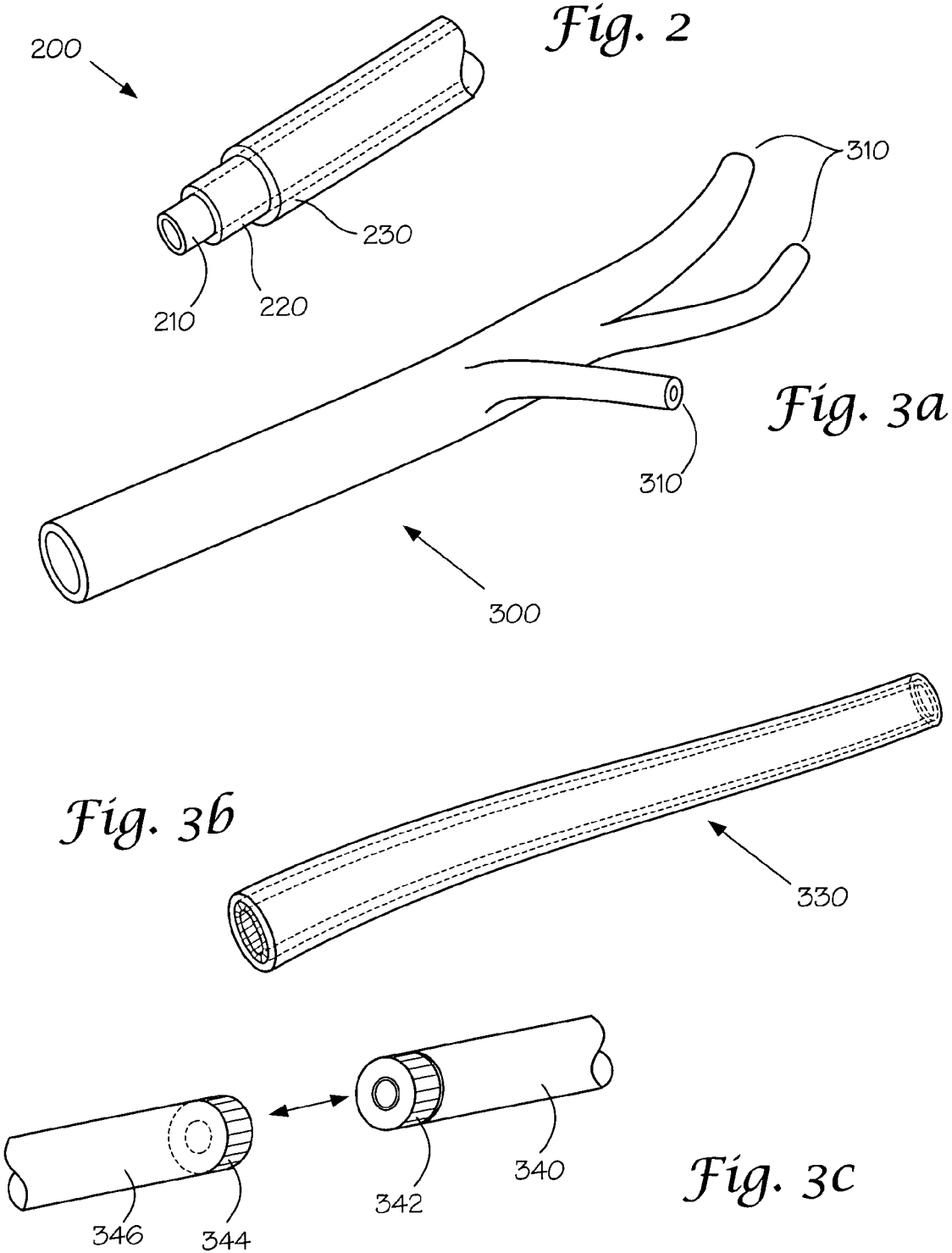

FIG. 7
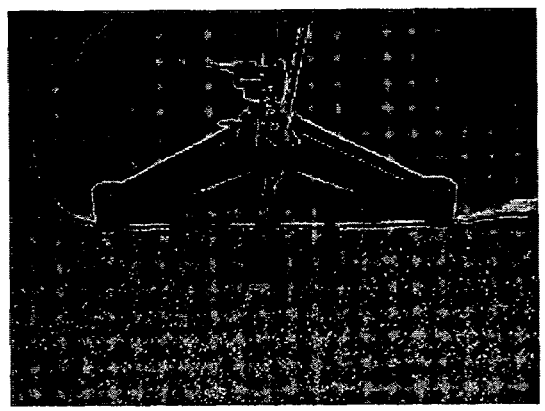 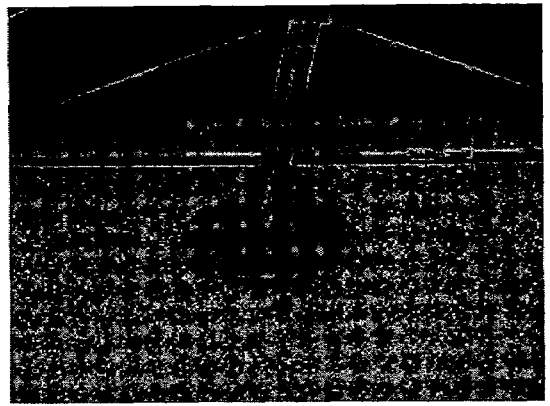
A  B

FIG. 9
A 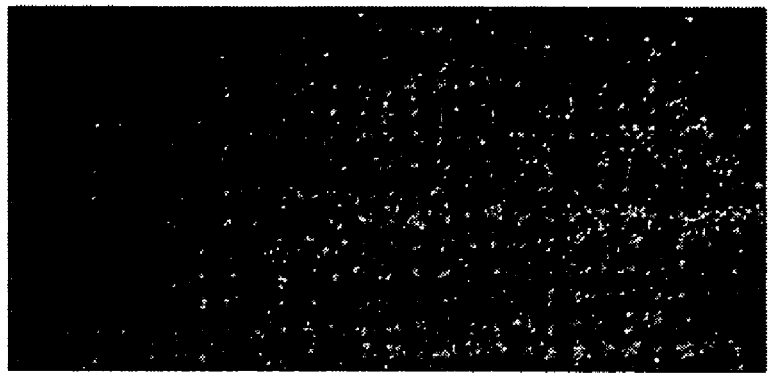
B 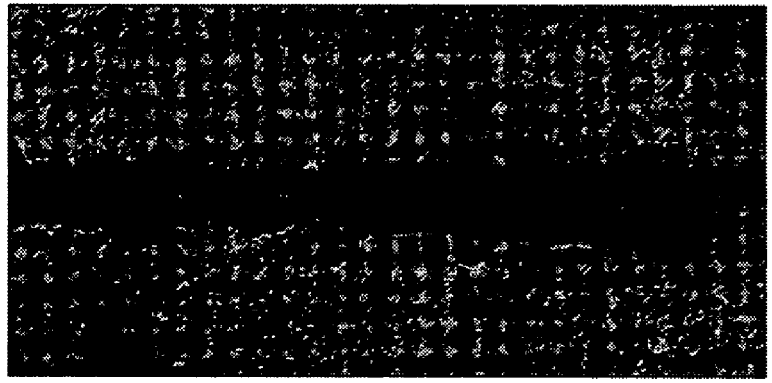
C 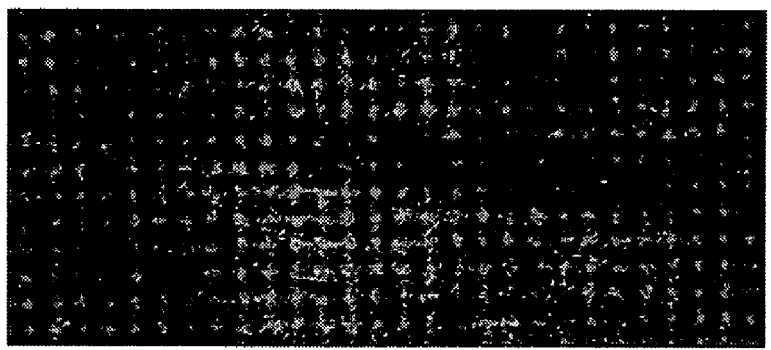

MODELS AND METHODS OF USING SAME FOR TESTING MEDICAL DEVICES

BACKGROUND OF THE INVENTION

During the development of any new medical device, various tests may be required, including the characterization of physical properties (geometric, mechanical, electrical, electromagnetic, thermal, chemical, etc), the evaluation of overall device performance (numerical simulation or simulated use testing), or testing to determine the effect of the device on living tissues. These development tests may be broadly classified as either biological tests, theoretical tests, or physical tests, although there are areas where these testing classes overlap one another.

Biological testing generally involves an analysis of the interaction between the device and human or animal tissues. The biological tests that are performed first are generally biocompatibility tests, which evaluate the tendency of the device to cause damage to living tissues by mere presence of the materials comprising the device. Later on in the development cycle, the device may be tested in a live animal (animal study) or a human patient (clinical trial) to determine the ability of the device to perform its intended use and to evaluate safety and efficacy (device performance). Animal studies represent a special type of test known as simulated use testing, so called because the animal is a simulation of the actual use (human) environment.

Theoretical or computational tests may include finite element analysis, kinematic analysis, and computational fluid dynamics. These tests employ knowledge of the physical properties (strength, mass, density, viscosity, etc) of the device and actual use environment to construct a computer model of the device—tissue system. This type of model may then be used to predict device performance, the tendency of the device to fail, and possibly the tendency of the device to cause injury. Of course, these models are limited by the assumptions made in their derivation and the computational power of the computer. Unfortunately, it may be difficult to quantitatively describe a device, and more importantly the actual use environment, in sufficient detail to yield realistic results.

Physical testing essentially evaluates the design of the device. That is, this physical testing may involve; (1) the measurement of device geometry such as lengths, diameters, and wall thicknesses, (2) the measurement of mechanical properties such as tensile strength and stiffness, (3) the measurement of other device characteristics such as color, thermal conductivity, dielectric properties or other properties, or (4) simulation testing involving trial use of the device in some model of the actual use environment. The purpose of this simulation testing is to evaluate the safety (tendency to injure) and efficacy (performance characteristics) of the device, and in general to evaluate the ability of the device to perform it's intended use. As previously stated, animal studies are one important form of simulation test. Other vehicles (the simulated environment) for this type of testing include cadavers (both human and animal) and benchtop fixtures, which are man-made representations of a particular target anatomy.

The new FDA quality system regulation (QSR) now requires testing under simulated or actual use conditions for all nonexempt Class II and Class III medical devices. Not all manufacturers perform actual use (human clinical trial) testing for every medical device, so in these cases simulation testing is definitely a requirement. At least four traditional simulation options are available to meet this requirement, each with its own advantages and drawbacks. These four general approaches (Table I) to simulation testing involve theoretical (computer) models, benchtop (physical) models, cadaver (human or animal) models, and live animal models. Once again, human subjects are also employed in the development of many medical devices, but since humans represent the actual use environment, these tests (clinical studies) are not considered simulation tests.

TABLE I

The four general approaches to simulation testing including the environment and models involved.

| Theoretical Model | Benchtop Model | Cadaver Model | Live Animal |
|---|---|---|---|
| In vitro | In vitro | In vitro | In vivo |
| Theoretical or computational model | Physical properties model | Human or animal cadaver | Animal study |

Typical medical device development schemes generally involve testing early prototypes in simple bench top test fixtures. Feedback from these tests shape the product through design revisions that are subsequently evaluated using the same model. However, since this process is iterative, as the design matures the models that are needed generally become more complex. For example, a new coronary catheter may undergo initial testing in simple plastic tubes, followed by glass models designed to mimic the size and geometry of the coronary vasculature. The product may experience a series of changes resulting from these tests until the designer is satisfied with performance, and once a certain level of confidence is achieved the testing will proceed to the next available model. In the medical device industry this model is generally a live animal.

In practice, the medical device industry typically employs one or more of the four previously mentioned (Table I) model types in simulation testing prior to seeking approval for human use (a clinical trial). Of course, common sense dictates that the model selected be representative of actual use conditions, but only the clinical trial, which is not a simulation test, fully satisfies this criteria. Unfortunately, human subjects are unavailable for use until late in the development cycle due to risk, regulatory, and ethical considerations. A live animal model has therefore traditionally been the next best choice.

Animal models are currently the gold standard of preclinical trial medical device simulated use testing. In fact, the quality of data produced in these studies can be very high, particularly if the proper animal model is selected, the device and protocol are well designed, and the correct number of animals is used. Designed experiments are possible and are commonly employed, but require an increase in the number of animals. These tests are also performed under physiological (for the animal) conditions. Unfortunately, these studies are expensive because of the staff and facilities required to support the work. A registered facility must be contracted to run the study and care for any animals purchased, a surgeon must be retained to perform the required procedures and to generate the study protocol, and the services of a veterinarian, anesthesiologist, and surgical aide are also required. These studies can easily exceed $100,000 in total costs, and grow even more costly as the number of animals is increased.

The inability to test prototype devices on human subjects is the reason medical device developers resort to animal studies in the first place. Still, animal models suffer from a whole range of unique problems, including the many deviations between human and animal anatomy and physiology, the confounding effects of variation between individual animals, and the unpredictability that arises from using a model that is extraordinarily complex.

Animal models may include live canine, porcine, or bovine specimens, among others. While these animals do offer an in vivo environment, their anatomy and physiology differs significantly from that of a human. The great expense and specialized facilities required limit their in-house use. Reproducibility may also be an issue as both inter- and intrasubject variability are difficult to control. Additional considerations include contention with the Animal Welfare Act, the significant expense associated with contracting regulated facilities and medical practitioners, and the risks related to handling biohazardous materials.

To get around these issues, developers tend to gravitate toward simpler and more accessible models such as cadavers and benchtop fixtures. Unfortunately, there tends to be an inverse relationship between the usefulness and complexity of the model employed. For example, cadaver tissues provide an accurate representation of anatomical geometry, but the required chemical preservation greatly alters the physical properties of the tissues. In addition, biological temperatures and flows cannot generally be simulated, subjects are difficult to source and maintain in useful quantities, and an educational institution must almost always be contracted (at considerable expense) to perform the study.

These factors drive early stage medical device developers to simple benchtop fixtures made (usually) in house by the developer. Unfortunately, these models are typically designed by individuals lacking an understanding of anatomy and physiology, and are usually fabricated from typical engineering materials such as metal, glass, and plastic. While an argument may be made that these models are better than nothing, they are certainly not representative of actual use conditions. Furthermore, engineers in general will agree that the quality of test data is dependent on the good logic behind the test protocol and the quality of the model employed. A poor model is therefore more likely to yield misleading data, and a design based at an early stage upon this data is more likely to require correction at a later stage in development.

BRIEF SUMMARY OF THE INVENTION

The use of a poorly conceived model in development testing will lead to reduced product quality, increased development costs, and greatly lengthened product timelines. Fortunately, these failures may be avoided by employing an intelligent development scheme in conjunction with a high quality model. Accordingly, the subject invention pertains to complex synthetic anatomical models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

The model embodiments of the subject invention may serve as a highly sophisticated bench top model that is designed to be used by medical device developers both early and late in the development process. These models mimic not only the geometry of the target anatomy, but also the physical properties of the living tissues that contact the device.

One important feature of certain embodiments of the subject invention is the implementation of synthetic analog materials that can simulate the physical properties of living tissues. These analogs are in most cases hydrogel materials that are designed on the basis of physical tests performed on actual target tissues. For example, a particular analog material might be designed to exhibit a tensile strength close to 10 kPa to mimic a target tissue that exhibits a tensile strength of 10 kPa. One or more components made from these analog materials are then assembled into a configuration that mimics both the size and geometry of the target organ. The resulting bench top model may therefore be described as a synthetic organ, and it will respond to certain physical stimulus (the device) in a fashion that is similar in many respects to the actual organ.

Model embodiments of the subject invention may be nearly as simple to use as a bench top fixture, but provide feedback that is superior in many respects to cadaver tests, animal studies, and even human clinical trials. In fact, a prototype device may be tested not just in terms of device performance, but also in terms of effect on the target anatomy. This is possible because the device interfacing portion of the model is removable, allowing a quasi-histological examination of the target anatomy after each use. In addition, because the models are artificial and mass produced, multiple tests may be performed either under identical conditions or by altering only the test parameters (temperature, flow, contact angle, etc) desired. This capability helps to eliminate the statistically confounding effect of model variation that plagues cadaver, animal, and human subject studies, and also enables the use of designed experiments to explore device-tissue interactions and interactions between various design parameters.

Some embodiments of the subject invention have several advantages over typical bench top fixtures. Some fixtures in use today may be designed to mimic the overall size and geometry of a particular target tissue, and the best of these are also designed to work at body temperature in the presence of fluids. However, the use of engineering materials in the construction of these models make them dissimilar to the target anatomy in a profound way. This calls into question the value of any data collected, even when designed experiments are employed. In addition, these models may only be used to predict device performance, not the effect of the device on the target tissue.

In contrast, some embodiments of the subject invention enable a potentially large number of tests to be completed in an environment that is both geometrically and mechanically similar to the target anatomy. These tests may be performed by an engineering technician on a lab bench, but the tests still produce very high quality data. Also, because this data may be generated early in the development cycle, design errors are discovered sooner, leading to a shorter cycle and a reduced development budget. Further, unlike traditional bench top testing, use of embodiments of the subject invention allows the user to predict how a device will actually function in the human body, and since the effect of the device on the target tissue can be predicted by way of the quasi-histological examination, the risk to the patient may be predicted from the beginning of the process.

Use of embodiments of the subject invention also have several advantages over cadaver studies. Cadaver models provide a fairly accurate representation of size and geometry, but the mechanical properties of the target anatomy are altered by death of the subject and by the required tissue preservation techniques. It is impossible to use these models at normal body temperature or in the presence of fluids, and they cannot be employed to accurately predict the physical effect of the device on the target tissue. An educational institution must almost always be contracted (along with a principal investigator) to perform the study, and since the specimens are difficult to source it is common to run only a single test. Biohazards are an additional risk.

In contrast, use of embodiments of the subject invention enables the generation of animal study quality data (in a much greater quantity) using a simple bench top setup that may be used by an engineering technician. The need to contract with research facilities, employ costly medical practitioners, and also any exposure to biohazards is eliminated. In addition, these models may be used at body temperature in the presence of any real or simulated physiologic fluid, and since the device contacting portions of the model may be removed and replaced, an unlimited number of tests may be performed.

Models according to embodiments of the subject invention have several advantages over live animal models. As previously stated, the quality of data produced in these studies can be very high, particularly if the proper animal model is selected, the device and protocol are well designed, and the correct number (more is always better) of animals is employed. However, a registered facility must be contracted to run the study and care for any animals purchased. A surgeon must be retained to perform the required procedures, generate the study protocol, and to ensure approval from the animal care and use committee of the facility. The services of a veterinarian, anesthesiologist, and surgical aide are also required. Needless to say, these studies are very expensive and grow ever more costly as the number of animals is increased. The cost of discovering a design flaw at this stage is very high, possibly causing modification, termination, or repetition of the study. Biohazards are also a significant risk.

In effect, the inclusion of models according to the subject invention in the development process allows the collection of animal study quality performance data (Table II) at a risk level that is normally associated with bench top studies. In fact, by employing this technology early on in the development process, vital feedback on device performance may be collected before erroneous assumptions can adversely affect the design. This capability not only reduces the probability of costly late stage design changes, but also shortens the project timeline and reduces the overall cost of development. In addition, these models may be used in an ordinary laboratory by engineering personnel. The need to own or contract with research facilities, pay for costly medical practitioners, and absorb risks associated with biohazard exposure are all eliminated. An innocent life (the animal) is also spared.

These and other advantageous aspects of the subject invention are described in the detailed description below, description of the drawings, and the appended claims.

BRIEF DESCRIPTION OF THE DRAWINGS

FIG. 2 shows a perspective view of one embodiment of the subject invention directed to a luminal structure simulating a femoral artery.

FIG. 3 shows a perspective view of one embodiment of the subject invention directed to a luminal structure model simulating vasculature.

FIGS. 7A-B are photographs showing fixtures for bench top testing in accord with the teachings herein.

FIG. 9 are photographs representing the impact of each device on the tissue analog is illustrated in FIGS. 9A-C

DEFINITIONS

Figure 1:
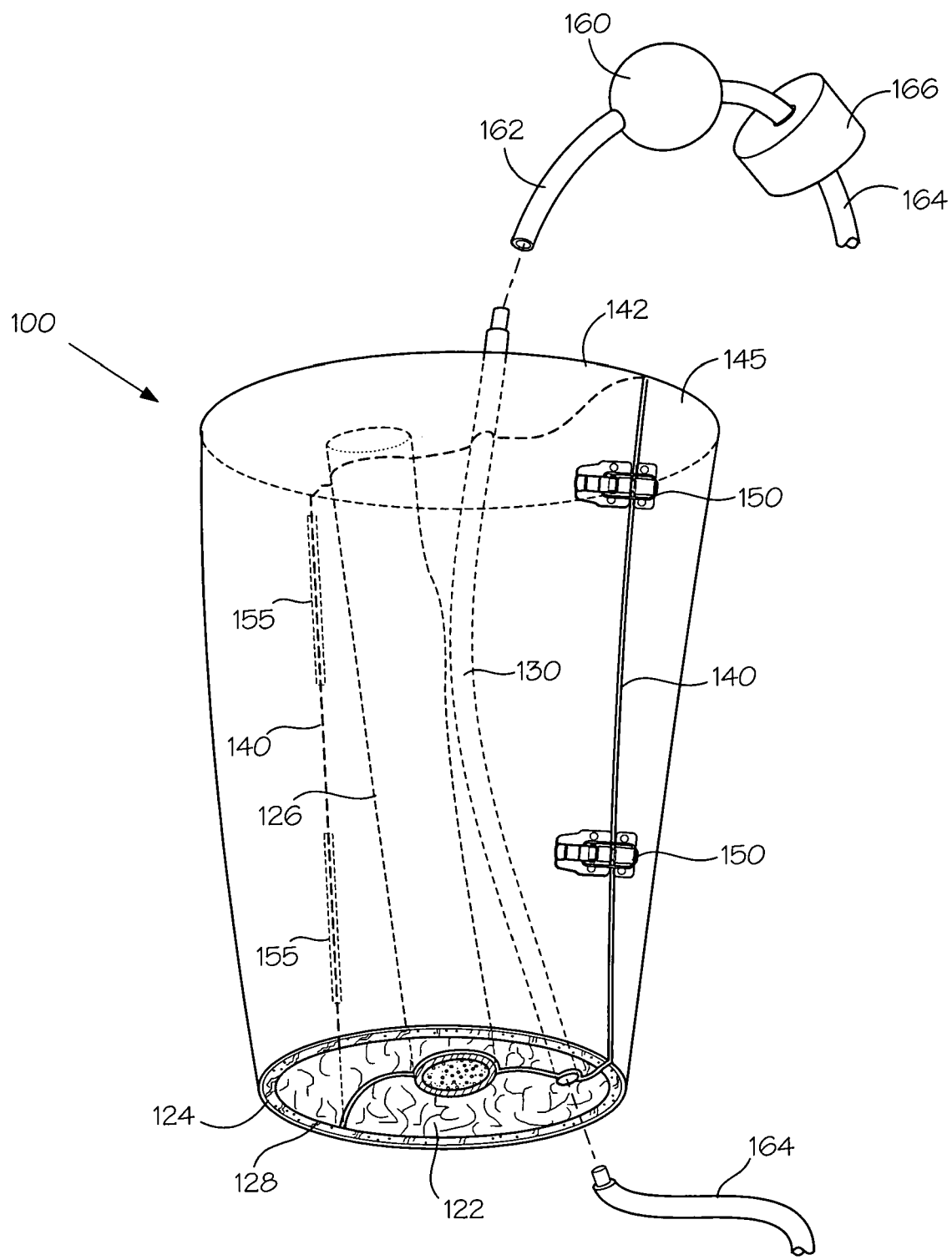
FIG. 1 shows a perspective view of one embodiment of the subject invention directed to a femoral artery model.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding of the invention as disclosed and claimed herein, the following definitions are provided.

The term "analog material" as used herein refers to a material or combination of materials designed to mimic one or more physical properties of a relevant target tissue. Analog materials may include, but are not limited to, hydrogel, silicone rubber, natural rubber, other thermosetting elastomers, other thermoplastic elastomers, acrylic polymers, other plas-

TABLE II

A comparison of the various model types available in industry.

| | Model Criteria | | | | | | | | |
|---|---|---|---|---|---|---|---|---|---|
| | Positive Attributes | | | | Negative Attributes | | | Quality Attributes | |
| Model | Lab Testing Possible | Predict Tissue Damage | Target Anatomy Modeled | Tissue Properties Modeled | Medical Contractors Required | Biohazard Exposure Risks | Live Animal Loss | Data Quality | Relative Expense |
| ARM | X | X | X | X | | | | High | Med |
| Fixture | X | | X | | | | | Low | Low |
| Cadaver | | | | | X | X | | Med | Med |
| Animal | | X | | X | X | X | X | High | High |
| Human | | X | X | X | X | X | | High | Extreme | tics, ceramics, cements, wood, styrofoam, metals, actual human tissues, actual animal tissues, and any combination thereof. Each component part in model embodiments may be constructed from one or more analog materials.

The term "hydrogel(s)" as used herein refers to a unique class of materials that contain a large amount of water and generally exhibit a high degree of elasticity and lubricity. These materials are ideal for simulating the physical properties of many living soft tissues. Hydrogels are materials that are wetable and swell in the presence of moisture and retain water without dissolving. These materials are generally constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding.

The term "luminal structure" refers to any structure in the body through which a substance flows through, including, but not limited to, the arterial and venous vasculature anywhere in the anatomy, the trachea, the sinuses, the oral cavity, the esophagus, the urinary tract, the ear canal, certain portions of the male and female reproductive system, the bile ducts, other portions of the digestive system, and any other part of the anatomy that resembles a luminal structure or cavity. Depending on the context in which the term luminal structure is used herein, it may refer to a representative anatomical structure in a living or deceased animal (i.e., native structure), or may refer to an artificial luminal structure intended to model such native structure. As described herein, artificial luminal structure may actually pertain to a luminal structure removed from a living or deceased animal but which is used as a model.

Accordingly, the term "geometrically mimic" as used herein refers to configurations of models that comprise a similar geometric feature of the target anatomical structure to be mimicked, such as length, width, diameter, thickness, cross-section, and/or, in most cases general shape of a particular target anatomy.

The term "lumen possessing human or nonhuman anatomical structure" as used herein refers to any anatomical structure that comprises as one of its features a lumen. In its most basic sense it is directed to the actual luminal structure itself such as a vessel, duct, tract, passage, orifice, airway, etc., as found in an a human or nonhuman animal. It may also be directed to a section of the anatomy that comprises a luminal structure cooperative with other tissue(s). For example, in no way intended to be limiting, it may pertain to a structure generally shaped like an organ, such as a heart, having luminal structures cooperative to the exterior and/or interior of the structure, such as in a heart example, the coronary arteries and aorta. In another example, not intended to be limiting, but merely for illustrative purposes, it may be a limb or a portion thereof, that contains within it one or more major blood vessels. In another example it may be a torso of a human body that has major blood vessels, ducts, and/or tracts comprised within.

In certain model embodiments, one or more components may be cooperative with other one or more components. The term cooperative in this context means that such cooperative components are contiguous, engaged, or integrated with one another. Further, components cooperative with one another may be designed to be dissociable, i.e., removably cooperative.

DETAILED DESCRIPTION

The interaction of a foreign body with living tissues results in complications that are related to, among other things, shear forces, normal forces, abrasive action, blunt trauma, pressure necrosis, or other physical insults caused by the invading device. Not only are studies to predict the long-term effect of this invasion difficult and expensive to conduct, but when live patients are involved the studies often yield inconclusive results. As an alternative to using these patients, a bench top model may be employed to physically simulate the insult to the tissue as a relatively inexpensive, easily repeatable, and logical first step before resorting to animal studies and clinical trials. However, for this approach to be productive, the model employed must be representative of the actual target anatomy in which the medical device will normally be used.

The subject invention pertains to complex synthetic anatomical models that are designed to enable simulated use testing by medical device companies, medical device designers, individual inventors, or any other entity interested in the performance of medical devices. These models are unique in possessing a level of complexity that allows them to be substituted for either a live animal, an animal cadaver, or a human cadaver in the testing of these devices. These models are further characterized by a similarity of geometry, individual component physical properties, and component-to-component interfacial properties with the appropriate target tissue and anatomy.

The model embodiments of the subject invention create a test environment similar in many ways (mechanical properties, physical properties, temperature, flow rate, viscosity, etc) to that of a living animal. In addition, individual tests may be repeated as many times as desired under identical or (if desired) altered conditions. Also, the tissue-contacting portion of the model may be removed to allow a quasi-histological examination to be performed after each test, an important feature that allows the engineer to predict the tendency of a particular device to inflict injury (or other effect) on the patient.

A study employing the models of the subject invention allows the generation of data that is comparable, and in some ways superior to that of an animal study. Furthermore, since these studies employ a reproducible model, the statistically confounding effect of variation between animals is eliminated. The ability to perform truly reproducible tests allows interactions between the device and the model, as well as interactions between multiple design parameters to be evaluated, a task which is nearly impossible with an animal study. In addition, the expense related to the purchase and housing of animals, contracting registered facilities, and retaining medical practitioners is eliminated. The risks associated with biohazards are also eliminated and a number of innocent animals are spared.

In one embodiment, the subject invention pertains to artificial anatomical models that geometrically mimic an anatomical structure comprising a luminal structure.

In another embodiment, the subject invention contains a luminal structure with segments or portions thereof that are constructed from hydrogel material. Alternatively, the entire luminal structure may be constructed from hydrogel material.

In yet another embodiment, the subject invention is directed to a luminal structure with segments or portions thereof that are constructed from standard engineering materials, but that are coated on the interior (medical device contacting) portion of the luminal structure with a hydrogel or hydrophilic material.

In a specific embodiment, the subject invention contains a luminal structure structure with segments or portions thereof that are constructed from either standard engineering materials or hydrogel materials, but with supporting (non-device contacting) structures constructed from hydrogel materials.

Available benchtop fixtures are designed to mimic the general size and geometry of a target tissue, and the best of these are also designed to work at body temperature in the presence of fluids. However, the typical use of engineering materials in their construction makes these common models dissimilar to the target anatomy and calls into question the value of any data collected using them, even when designed experiments are employed. In addition, these models may only be used to predict device performance, not the effect of the device on the target tissue.

In comparison, the model embodiments of the subject invention enable for the first time a potentially large number of tests to be completed and repeated under identical conditions in an environment that is both geometrically, mechanically, and physically similar to the target anatomy. An engineering technician may perform these tests on a simple benchtop setup, while still generating very high quality of data. Also, because this data is provided early in the development process, design errors may be discovered earlier; leading to a shorter development cycle and a reduced development budget. Finally, since the effect of the device on the target tissue can be predicted, device quality is improved.

Available cadaver models can provide a fair representation of anatomical geometry, but the mechanical and physical properties of the target anatomy are altered by preservation techniques. It is impossible to use these models at normal body temperature or in the presence of test fluids, and they cannot be employed to accurately predict the physical effect of the device on the target issue. An educational institution must generally be contracted, along with a principal investigator, to perform the study, and since the specimens are difficult to source it is common to run only a single test. Biohazards are an additional risk.

In comparison, the model embodiments of the subject invention facilitate the generation of animal study quality data using a simple benchtop setup that can be used by an engineering technician. These models may be used at body temperature in the presence of any real or simulated physiologic fluid, and since the device contacting portions of the model may be removed and replaced, an unlimited number of tests may be performed. The need to contract with research facilities, employ costly medical practitioners, and expose staff to the risks associated with biohazards are eliminated.

The models of the subject invention are characterized by a similarity of geometry, of individual component physical properties, and of component-to-component interfacial properties with living tissue. On the simplest level, individual model components are fabricated such that they mimic the geometry of a particular target anatomy.

The geometric data needed for fabrication is typically obtained in two ways. The traditional approach is to obtain data from the literature on morphology or from cadaver measurements. While not a bad approximation, this method is time-consuming and permits a large degree of error. A better method would be to get the geometric data directly from a patient or from sources such as the Visible Human Project.[2]

After collecting the appropriate geometric data, the individual model components may be fabricated from appropriate analog materials. Depending on the complexity of the part and the type of materials used, the individual component might be molded, extruded, or machined. For complex geometries, however, these techniques may become cumbersome and expensive. In these cases rapid prototyping techniques such as stereolithography offer a relatively inexpensive alternative. Techniques are being developed that allow actual patient data (obtained from MRI or spiral-CT images) to be fed directly into the rapid prototyping system, thus replicating the patient's anatomy exactly. This technology allows for the production of extremely realistic simulations.

The models of the subject invention are constructed from multiple components, and these individual components are fabricated in such a way that they mimic the geometry (length, width, diameter, thickness, cross-section, shape, etc) of a particular portion of the target anatomy that is relevant to the medical device under test.

The analog materials used to manufacture the individual components of the subject invention are formulated to exhibit one or more physical characteristics of a target living tissue such as, but not limited to, uni-axial or multi-axial tensile strength or modulus, uni-axial or multi-axial compressive strength or modulus, shear strength or modulus, coefficient of static or dynamic friction; surface tension; wettability; water content; electrical resistance and conductivity; dielectric properties; optical absorption or transmission, thermal conductivity, porosity, moisture vapor transmission rate, chemical absorption or adsorption; or combinations thereof. Each analog material is designed so that the physical properties of the analog will match the physical properties of the relevant tissue on which the analog is based. More specifically, each analog material is formulated so that the physical property or properties of the analog fall within a range that 50% or more similar to the targeted physical property or properties of the relevant living tissue on which the analog material is based.

The aforementioned listed physical characteristics are well understood, and may be determined by well-established techniques. References teaching the determination of different physical properties (in no way intended to be an exhaustive list) include the following:

(1) Shigley, J. E., and Mischke, C. R. *Mechanical Engineering Design*, $5^{th}$ Ed., McGraw-Hill, 1989.

(2) Harper, C. A., *Handbook of Materials for Product Design*, $3^{rd}$ Ed., McGraw-Hill, 2001.

(3) Askeland, D. R., *The Science and Engineering of Materials*, $2^{nd}$ Ed., PWS-Kent, 1989.

(4) LaPorte, R. J., *Hydrophilic Polymer Coatings for Medical Devices*, Technomic Publishing, 1997

(5) Hayt, W. H., and Kemmerly, J. E., *Engineering Circuit Analysis*, $4^{th}$ Ed., McGraw-Hill, 1986.

(6) Park, J. B., and Lakes, R. S., *Biomaterials, An Introduction*, $2^{nd}$ Ed., Plenum Press, 1992.

(7) Lindenburg, M. R., Editor, *Engineer in Training Manual*, $8^{th}$ Ed., Professional Publications, 1992.

Particular teachings of certain physical properties are noted (references numbers related to preceding list):

*Tensile strength and modulus*, both measured in Pascal (Pa)—Ref 1, pg 186.

*Compressive strength and modulus*, both measured in Pascal (Pa)—Ref 2, pg 718.

*Shear strength and modulus*, both measured in Pascal (Pa)—ASTM Standard D3165-00, Standard Test Method for Strength Properties of Adhesives in Shear by Tension Loading of Single-Lap-Joint Laminated Assemblies.

*Coefficient of static and dynamic friction*, a dimensionless number—Ref 7, pg 445.

*Surface tension*, measured in dynes/cm—Ref 6, pg 57.

*Wettability*, measured in terms of contact angle (degrees)—Ref 4, pg 3.

*Water content*, measured in mass percent (%)—Ref 4, pg 41.

*Electrical resistance and conductance*, measure in ohm for resistance and mho for conductance—Ref 5, pg 25.

*Dielectric properties*, measured in various units—ASTM Standard E2039-04 Standard Test Method for Determining and Reporting Dynamic Dielectric Properties.

*Optical absorption and transmission*, measured in $cm^{-1}$—Ref 3, pg 739.

*Thermal conductivity*, measured in cal/(cm-s-C)—ASTM Standard D5930-01 Standard Test Method for Thermal Conductivity of Plastics by Means of a Transient Line-Source Technique.

*Porosity*, measured in percent (%)—Ref 3, pg 490.

*Moisture vapor transmission rate*, measured in $g/(mil-in^2)$—Ref 2, pg 941.

The individual components of the subject invention are assembled in such a way that the interaction between adjacent components yields the overall interaction expected in the actual target tissue. That is, the interfacial properties (bond strength, component-to-component friction, etc) between the various model components are designed to simulate the interaction between the relevant tissues in the target anatomy.

In designing particular embodiments of the subject invention, the relevant anatomy may be conceptually divided into discrete sections that will form the individual components of the model. For example, a model of the femoral artery might employ at least two (and possibly many more) analog materials: one for the femoral artery component and one for the supporting tissue component. Furthermore, these analog materials are formulated to mimic one or more properties of the target tissue. This generally involves implementation of two design parameters (modeled properties and data source) to be determined.

The first design parameter typically entails selecting physical properties that are important for the analog material to mimic in the decided application. These properties will vary depending on the type of device under test, the target anatomy, and the general objective of the testing. For example, if one objective is to determine the tissue damage caused by a device tracking through the femoral artery it would be advantageous to include abrasion resistance in the properties list. In addition, if a further objective is to simulate the tendency of the device to penetrate the artery wall then penetration resistance or shear strength might be included in the list as well. Any number of properties may be included in the target properties list, but it should be noted that as this list gets longer it becomes progressively more difficult to satisfy all of the design requirements. In fact, in typical embodiments, if a particular component requires an analog material with more than three target properties it might be better to separate the components into multiple parts.

The second design parameter typically involves selecting the source of the physical properties data. That is, it should be determined if the model will be based on human or animal (or both) tissue properties. Once this is determined, the data may either be drawn from the literature or generated directly by performing the appropriate physical tests on actual samples of the target tissues. The most common tissue sources for non-human properties tests are the sheep and pig, but other animal sources are possible as well.

In one embodiment, once the geometry, target properties, and source animal have been selected, tissue testing may commence. Using the very simple femoral artery model brought up as an illustrative example, the model could consist of at least two structural components (artery and support tissue) made from two different analog materials. If it is assumed for the sake of this discussion that the model will be used to evaluate abrasive tissue damage and ease of device passage through the artery, and further assumed that the analog materials will be designed around porcine tissue properties, then a pig must be sourced and sacrificed to produce the required samples for testing. It is important to note that tissues begin to degrade immediately after death so preserved samples ideally should not be used for this purpose. The tests performed on the tissue samples may include abrasion resistance, shear strength, and lubricity, but other tests might be included as well.

The data collected from this testing regime will be used as a target in the design of the analog materials, and the design intent is that these analog materials exhibit physical properties that mimic the physical properties of the target tissue samples. After the materials are formulated their performance will be verified by repeating the same physical properties tests that were performed on the original tissue samples on the newly formulated analog material samples. Of course, these tests must be performed under conditions as reasonably similar as possible to the original (tissue sample) tests.

Part of the design process involves prioritizing the various target properties for the synthetic analog materials. Less important properties should be placed further down the list and given a lower priority during the formulation process. This is typically, though not necessarily, required because the design becomes progressively more difficult to produce as the number of modeled properties increases. The number of target properties are preferably limited to three or fewer. If more complex model behavior is required than this restriction will allow, then the number of components can be increased instead. For example, the artery might by constructed from three two-property analog materials instead of one three-property analog. Typically, a component comprised of several analogs will exhibit a more complex (and realistic) response than a component constructed from a single (multi-property) analog. In the case of the femoral artery model, the artery component itself is preferably composed of two or three different analog materials. The model may also employ multi-part components for skin, fat, muscle, and bone.

The choice of materials used in a constructing the model will to a large extent determine how realistically the model simulates the in vivo environment. For example, many medical device companies presently use glass tubing to mimic portions of the cardiovascular system; however, glass is obviously more rigid than most biological tissues and tends to be much smoother than the luminal structureal surface of diseased, or even healthy, blood vessels. Consequently, a catheter will behave much differently in a glass model than in an actual blood vessel.

The composition of individual analog materials is unimportant as long as the relevant properties are accurately modeled. Typical engineering materials, including many metals, ceramics, and plastics commonly employed in industry may be used depending on the required analog properties. However, in cases where soft tissues are being modeled it will generally be advantageous to use nonstandard materials such as hydrogels. These materials swell in the presence of moisture and can retain large amounts of water without dissolving. They are constructed of one or more hydrophilic polymer molecules, although copolymerization with hydrophobic monomers may also lead to the formation of a hydrogel. These materials are generally elastic, and exhibit a three-dimensional network that is either crosslinked directly by chemical bonds or indirectly through cohesive forces such as ionic or hydrogen bonding. Hydrogels are particulary advantageous in this application because the formula may be manipulated to give a combination of water content, lubricity, abrasion resistance, and other properties characteristic of living soft tissues. In this respect these materials are particularly suited to modeling fragile tissues such as venous or arterial intima and ciliated epithelia. Hydrogels also provide an ideal substrate for maintaining a surface of live cells if so desired.

The models of the subject invention employ a wide variety of hydrogel materials, including but not limited to polyvinyl alcohol, polyvinyl pyrrolidone, polyethylene oxide, and polyhydroxyethyl methacrylate. This entire class of materials is physically more tissue-like simply by nature of incorporating water, but by carefully controlling such parameters as molecular structure, density, wall thickness, durometer, and many other physical properties and characteristics a good match between the actual tissue and analog material may be achieved.

Poly(vinyl alcohol) is normally produced by the acid-catalyzed hydrolysis of poly(vinyl acetate), which effectively converts the pendant acetate groups to hydroxyl groups. The properties of the resulting polymer are determined by tacticity, degree of hydrolysis, and molecular weight. Most commercial grades of PVA are stereoregular (primarily isotactic) with less than 2% of the repeat units forming in the 'head-to-head' (adjacent hydroxyl groups) configuration. In theory this should allow a high degree of crystallinity in the finished product. However, this is hindered by the presence of residual acetate groups so the tendency toward crystallization depends primarily on the degree of hydrolysis. This refers to the percentage of converted acetate groups on the main chain. Partially hydrolyzed grades (less than 75% conversion) do not crystallize significantly and are soluble in water at room temperature. This is because the large number of bulky acetate groups increases free volume and prevents the long-range interchain associations required for crystallization to occur. As the degree of hydrolysis increases the loss of bulky acetate groups reduces free volume and the chains are allowed to more closely approach one another. The compact but highly polar hydroxyl groups then come into close proximity and 'bind' the chains together through strong hydrogen bonding. These interchain forces increase the degree of crystallinity and greatly reduce solubility. In fact, in spite of the high concentration of hydroxyl groups completely hydrolyzed grades of PVA should be heated to nearly 100 C. to attain solution. These materials exhibit excellent mechanical properties and chemical resistance and also swell to a significant degree.

The properties of PVA hydrogels vary with molecular weight, but since these materials are normally obtained in polymer form the molecular weight cannot easily be adjusted. Instead these properties are typically modified by means of chemical or physical crosslinking. Chemical gels are easily formed by the addition of agents which undergo condensation with the hydroxyl groups on the main chain. A number of aldehydes (glutaraldehyde, formaldehyde, etc.), dicarboxylic acids (adipic acid, terephthalic acid, etc.), and metal ions ($Fe^{3+}$, $B^{5+}$, etc.) will form chemical bonds with PVA which result in crosslinks. Longer molecules such as diacids are generally preferred over metal ions because the ion 'bridge' is short and restrictive, embrittling the material. Molecules such as adipic acid can effectively restrict chain mobility while maintaining some measure of flexibility.

The orientation of a given gel material may be induced by drawing the material, by heat treatment, or by casting the polymer in solution with a gelling agent. These agents create specific interactions between the hydroxyl groups on adjacent chains, bringing them together to improve hydrogel bonding. Many such agents are known, and this process is easily employed on a laboratory scale. This is the method the author employed for the fabrication of PVA gels used in this study.

The process (Table III, see Example 1 below) is very simple and basically only involves dissolving the polymer in a solution of water and the gelling agent, dimethyl sulfoxide (DMSO). This solution will spontaneously gel over several hours at room temperature or when chilled. The properties of the resulting gel depend on the molecular weight and concentration of the polymer in solution, as well as the concentration of the gelling agent. Increasing the concentration of the agent tends to improve mechanical strength, but also reduces swelling. At any rate, the amount of gelling agent should be minimized because it must be extracted prior to use.

Validation of embodiments of the subject models is, in most cases, a desired objective. First, it will help determine the degree of realism of the simulation—in other words, how accurately the simulation performs compared to the in vivo environment. If the intent is to simulate blood flow in the carotid artery, for example, one type of validation would reveal how flow rate in the simulation compares to the flow rate in the patient.

Validation also identifies the limitations of the simulation. Especially in theoretical simulations, it is important to understand not only the accuracy of the model but also the circumstances under which it breaks down. A simulation might be highly accurate under normal situations, but if an abnormality is introduced, the simulated results might not be representative of a similar abnormality in vivo. Finally, if data from the simulation will be used in support of an FDA submission, it is even more important that the simulation be validated. The stronger the validation, the stronger the submission.

In general, three validation strategies are available: quantitative, qualitative, and indirect. Quantitative validation involves collecting numerical data from the simulation and comparing it to data collected in vivo under similar conditions. Collecting quantitative data usually involves the use of instrumentation—for example, pressure transducers to record simulated blood pressure. Common diagnostic technologies such as ultrasound or MRI might also be used. Of course, technologies such as ultrasound are designed for use on biological tissue, and since the simulation will probably be made of inert materials, some modifications may be necessary, as those skilled in the art will appreciate in view of the teachings herein.

In qualitative validation, experienced users (usually clinicians) use the device in the simulation following the same protocols they would follow when using the product in a patient. After the simulated procedure, users convey in as much detail as possible how the device performed in comparison to their experience of using a comparable device in a patient. To test a new product, the manufacturer should identify current users of similar products. For obvious reasons, users having the most clinical experience will typically yield the best results. When used properly, the "touchy-feely" data generated in the qualitative validation are as important as the numerical data obtained from the quantitative validation.

Indirect validation involves the comparison of physical performance data from the model to the actual use environment. This is the type of validation that is integral to the design process for Animal Replacement Models. The basic logic behind this form of validation is that if the individual model components exhibit properties similar to the target tissues then the model as a whole will exhibit performance similar to the synthetic organ being constructed. This type of validation will typically be followed by other tests once the model is completely constructed.

A strong validation strategy involves a combination of all of these techniques. Conducting only one type of validation leaves open the possibility that some important piece of information has been missed. When used together, the results help maximize the accuracy and degree of realism of the simulation.

The model embodiments of the subject invention comprise features that make them valuable for medical device design and development testing. First, since the models are designed to respond to physical stimulus in a fashion similar to the target (human or animal) anatomy, device performance in the model may be used to predict device performance in the target anatomy. Second, the device interfacing portion of the model may be removed for quasi-histological examination, allowing the effect of the device on the target anatomy to be measured. This is particularly important because it allows the potential for injury to be predicted. Third, because the device interfacing portion of the model can be removed and replaced, a large number of tests can be performed under either identical or varying conditions as desired. This would allow the generation of descriptive statistics on device performance and the execution of meaningful designed experiments, both of which are impossible with live animals or cadavers. Fourth, if a hydrogel substrate is employed to support a living tissue bed, the effect of the test device on actual living cells can be predicted. Fifth, the models may be equipped with pumps, heaters, and other accessories to more accurately model almost every aspect of actual use conditions. Sixth, the models may be equipped with sensors that allow the measurement of device influences such as applied force and pressure on portions of the target anatomy. Also, these models provide a wide range of cost, safety, and logistical benefits to device developers compared to existing benchtop models, cadavers, and live animals.

Description of the Illustrative Embodiments

FIG. 1 shows one embodiment of the subject invention directed to a femoral artery model 100. The model 100 comprises artificial support tissue including muscle 122, skin 124, bone 126 and fat 128. Embedded into the artificial muscle 122 is a luminal structure 130 geometrically simulating a femoral artery. Portions of the luminal structure walls may be constructed of hydrogel, or preferably, as shown in FIG. 1 entire luminal structure wall is constructed of hydrogel material. The artificial support tissue may be constructed of hydrogel material, but not necessarily, and typically is made of other types of materials such as latex, rubber, silicone or combinations of the foregoing. The model 100 also comprises a seam 140 running along the longitudinal axis of the model 100. The model comprises two segments 145 and 142 which are brought together and engaged to one another by an appropriate mechanism. The segments 145 and 142 may be separated to access luminal structure 130 to remove for testing and/or to replace with another luminal structure for additional testing. For example, upon the luminal structure 130 being subjected to a predetermined test or simulated procedure while in the model 100, the luminal structure 130 may be removed to study the affect of such test or procedure on the luminal structure 130. Once the luminal structure 130 is removed from the model 100, it may be replaced by another to conduct a replicate test or procedure, or different test or procedure, without having to replace the entire model. Those skilled in the art will appreciate that the engageable segments 145 and 142 may be engaged by one or more of several different mechanisms including, but not limited to, snap/friction fit, magnetic coupling, hook and loop, adhesives, tongue and groove, zipper, and/or latching mechanism. In a specific embodiment shown in FIG. 1, the two segments 145 and 142 are hinged together via a latching mechanism 150 and hinges 155 such that they are separated by pivoting from each other. This hinged and latching mechanism allows for easy and reliable opening and securing of the separate sections 145 and 142 together. Furthermore, in most cases, the testing of the luminal structure 130 will involve the employment of a liquid to be directed through the luminal structure 130. Therefore, the model 100 may be equipped with a pump 160 fluidly communicative with lines 162, 164 and reservoir 166.

FIG. 2 shows a close-up perspective view of a luminal structure 200 that may be used as the luminal structure 130 in embodiment 100 described in FIG. 1. The luminal structure 200 represents a femoral artery model comprising three different layers: 210 simulating the tunica intima, 220 simulating the tunica media, and 230 simulating the tunica externa.

FIG. 3a shows a perspective view of a removable luminal structure embodiment 300 that comprises branches 310. FIG. 3b shows a perspective view of another luminal structure embodiment 330 not having branches. The luminal structures 300 or 330 may be used as the luminal structure in the femoral artery model shown in FIG. 1 and described above.

Further, for the various removable luminal structure embodiments described herein it is valuable that they comprise a means that allows the facile engagement to the model. FIG. 3c is a perspective view of a removable luminal structure 340 comprising at one end a magnetic coupling 342 that is engageable with a corresponding magnetic coupling 344 associated with a receiving portion 346 associated with the model (not shown). Preferably, the engagement of the removable luminal structure 340 to the receiving portion 346 is such that it liquid tight. As discussed herein, depending on the type of testing to be conducted, and the target tissue to be simulated, it is desirable to implement a liquid that is directed through the luminal structure 340. Those skilled in the art will appreciate that a magnetic coupling means is not the only means of engaging the removable luminal structure 340. Other means include, but are not limited to, snap fit, adhesive, friction fit, interference fit, or hook and loop fabric.

Figure 4:
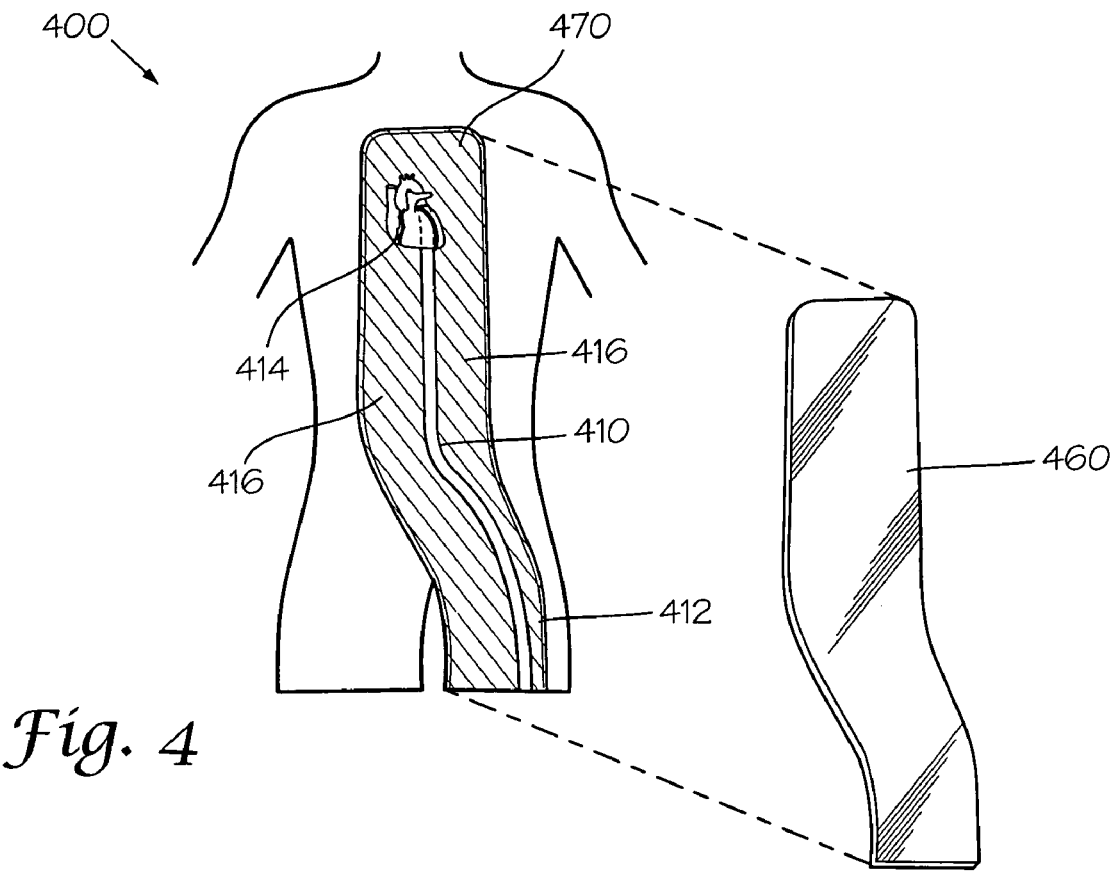
FIG. 4 shows a frontal view of one embodiment of the subject invention directed to a torso model.
Figure 5:
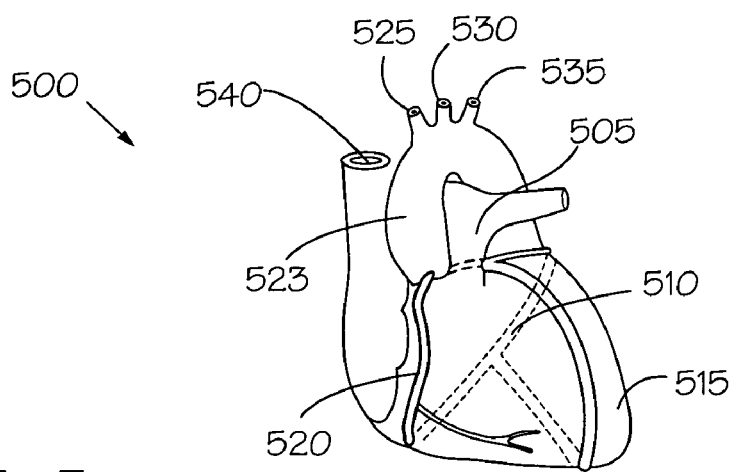
FIG. 5 shows a perspective view of one embodiment of the subject invention directed to a heart model.

FIG. 4 shows a partial breakaway view of another model 400 designed for testing medical devices intended to be directed to or implanted in a heart and approached through vasculature inferior the heart. The model 400 geometrically mimics a human torso with partial limb portions. The model 400 comprises a luminal structure 410 extending from one of the partial leg portions 412 to a simulated heart component 414. The luminal structure 410 has a femoral artery region, iliac artery region, abdominal aorta region, thoracic aorta region, descending aorta region, aortic arch region and ascending aorta region. The luminal structure 410 and supporting tissue region 416, i.e., tissue cooperative with and supporting the luminal structure 410 may be made of analog materials. Typically, the luminal structure 410 will be partially or wholly made of hydrogel. The luminal structure component 410 and heart component 414 may be readily dissociable from the supporting tissue 416. As described above for the femoral artery model, the model 400 may be comprised of two or more separatable segments so that they can be separated and access made to the luminal structure and/or heart to replace such components. As shown in FIG. 4, access to the luminal structure and/or heart is achieved by removing a door 460 defined on the model 400. The door 460 may be lifted off or pivoted open (such as by being hinged along one edge) such that access to the internal components in the internal chamber 470 is achieved. FIG. 5 shows a perspective view of a heart model embodiment 500 that may be implemented as the heart component 414 as described above for the heart model 400 shown in FIG. 4. The heart model embodiment 500 is therefore dissociable from the supporting tissue in and around the chamber 470 of the torso embodiment 400. The heart model embodiment 500 comprises luminal structures representing different coronary arteries: left coronary artery 505, circumflex artery 510, anterior interventricular artery 515, marginal artery, and right coronary artery 520. In addition, the heart embodiment comprises an aorta 523 with branches for the brachiocephalic 525, left common carotid 530, and left subclavian 535 arteries, as well as the superior vena cava 540. One or more of these luminal structures of the heart model embodiment 500 may be designed to be dissociable from the contiguous supporting tissue of the heart embodiment 500.

Figure 6:
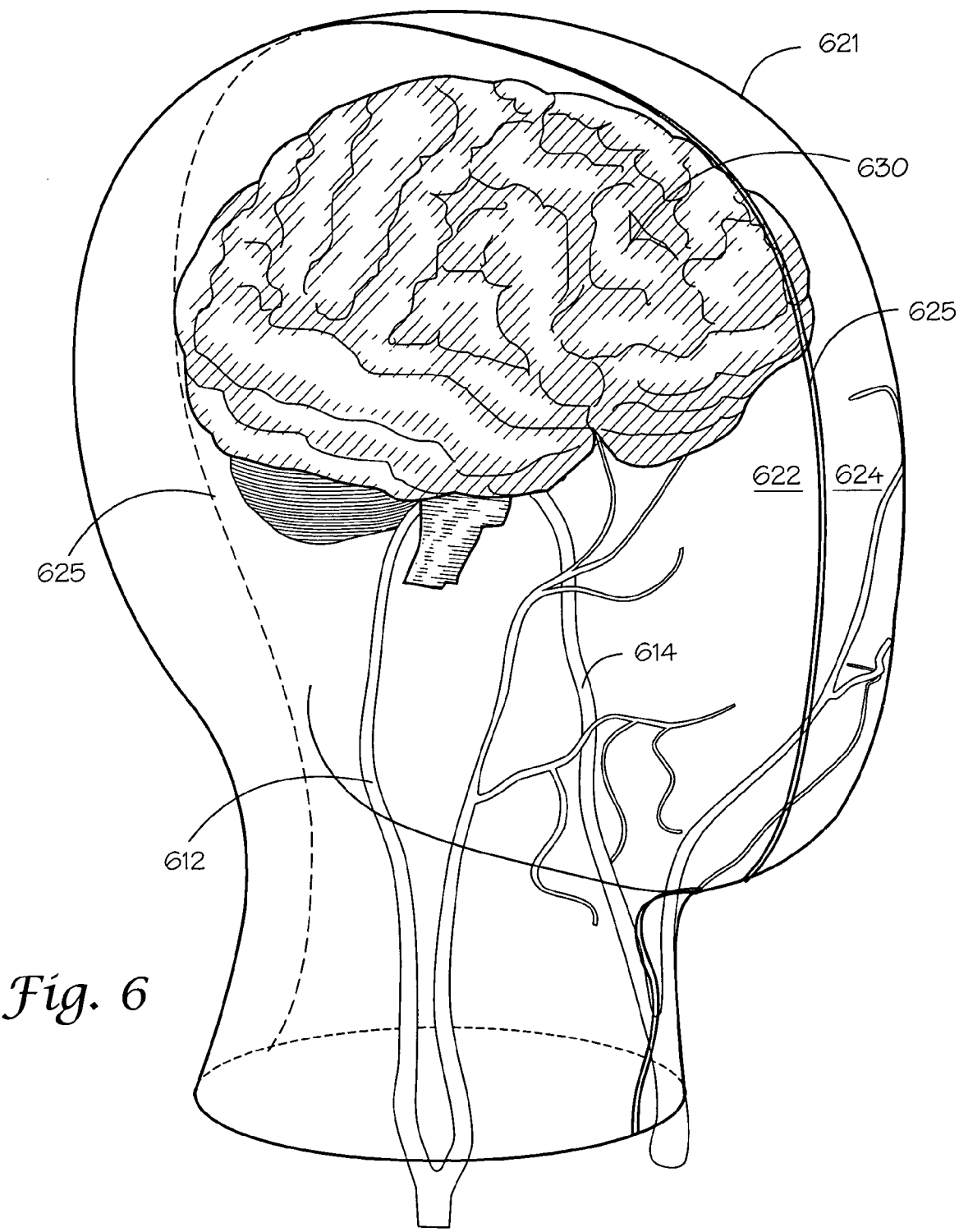
FIG. 6 shows a perspective view of one embodiment of the subject invention directed to a neurovasculature model.
Figure 8:
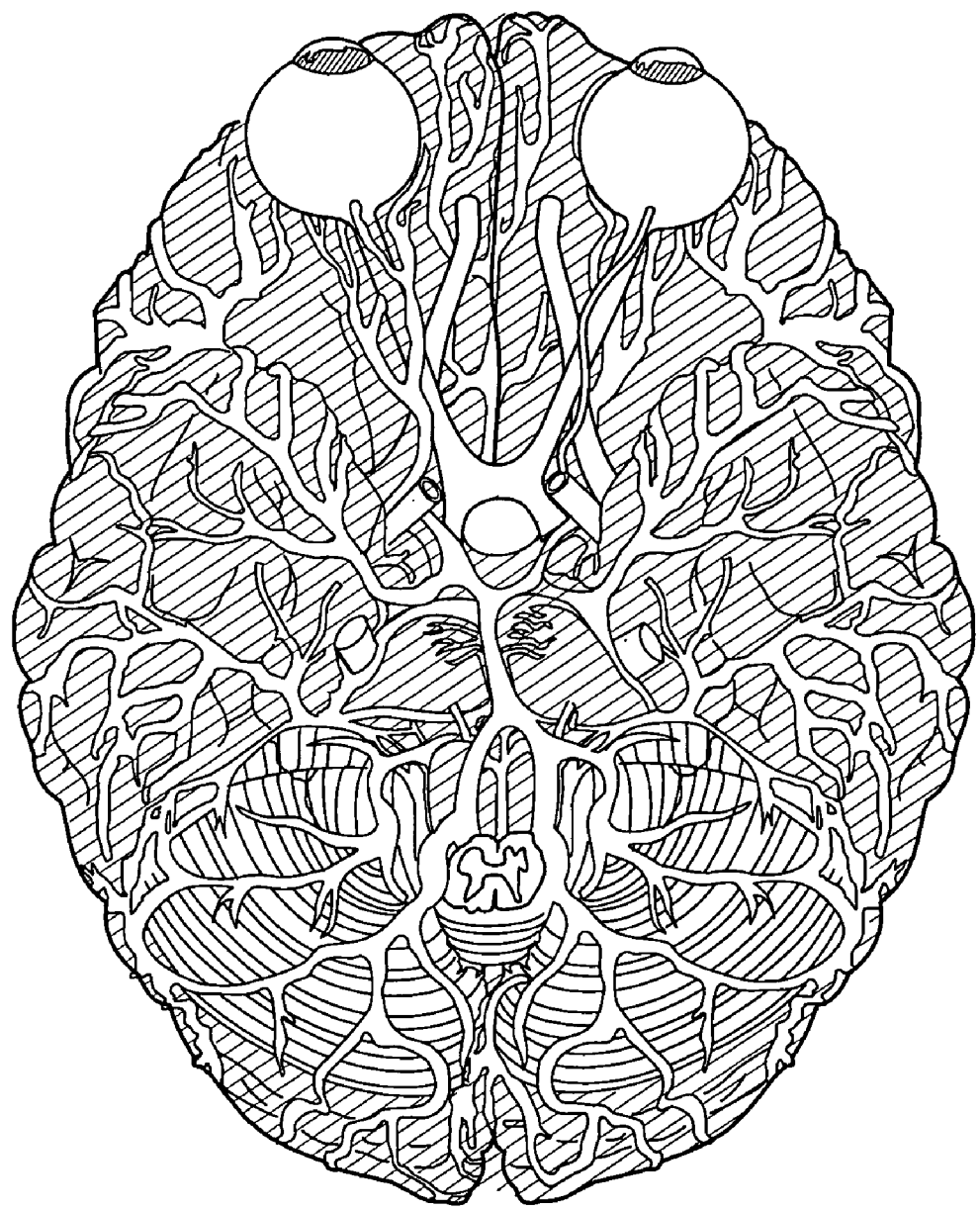
FIG. 8 is a rendering of a bottom view of a brain showing the level of detail of neurovasculature that may be implemented into a neurovasculature model.
Figure 10:
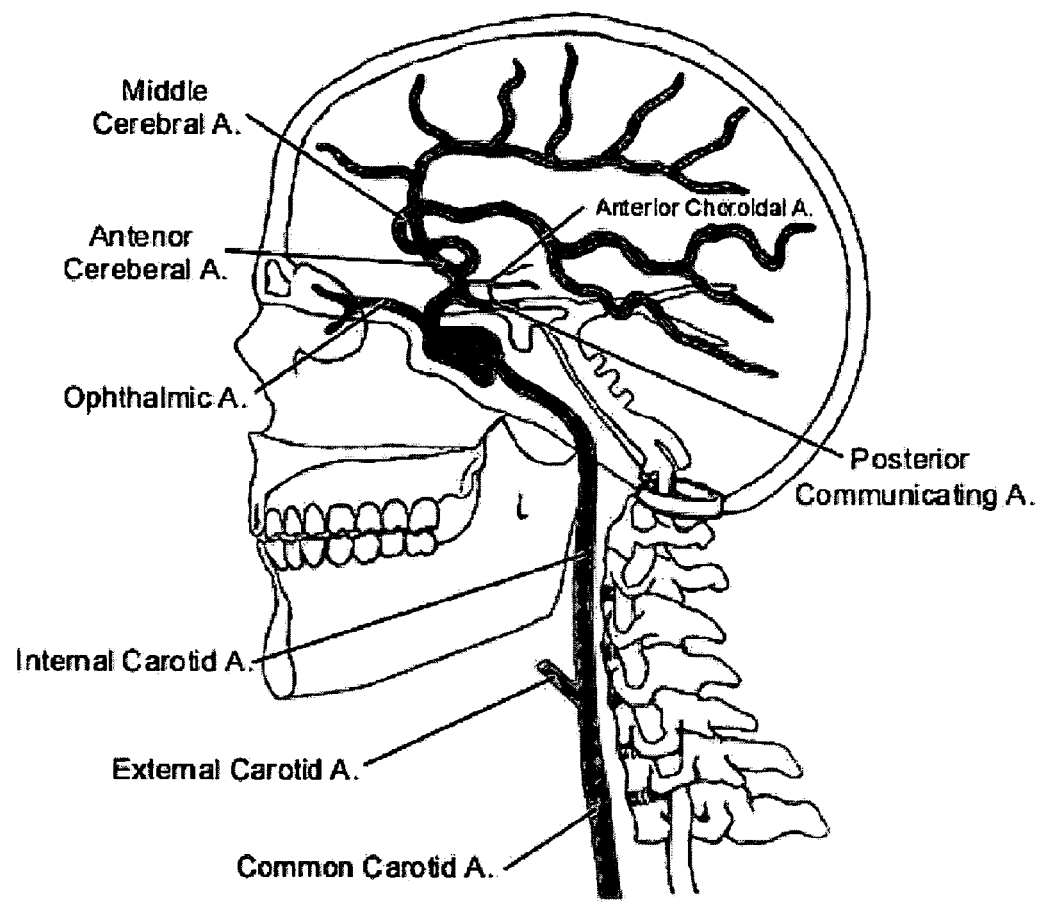
FIG. 10 is a cross-sectional view of a brain showing internal vasculature of the brain that may be simulated in a model embodiment of the subject invention.

FIG. 6 shows a transparent view of a neurovasculature model embodiment 600. The model is configured to geometrically mimic a human head and partial neck. The model 600 comprises a brain component 630 and multiple luminal structures geometrically mimicking and anatomically positioned to correlate to certain neurovasculature, such as right and left carotid arteries, 612, 614. The level of detail of the neurovasculature, as well inclusion of certain neurovasculature will depend on the particular needs and uses of the model 600. The model can be constructed to simulate neurovasculature surrounding the exterior of the brain as well as neurovasculature embedded within brain tissue. FIG. 8 is a bottom view of a brain showing, in detail, various neurovasculature associated with the brain. FIG. 10 is a cross-sectional view of a brain showing certain internal neurovasculature of the brain. The model 600 may be comprised of two or more removably engageable segments that are disengaged in order to access internal luminal structures and/or brain component 630, such as prior to or subsequent testing. As shown in FIG. 6, the model comprises a head support tissue casing 621 comprised of a right and left hemisphere segments 622, 624 respectively, as defined by seam 625. Segments 622 and 624 may be engaged together by a mechanism as described for embodiments 100 and 400.

EXAMPLE 1

Testing of a Guidewire Exchange Catheter

This following experiment describes a simple Animal Replacement Model used in the testing of a guidewire exchange catheter. The testing described includes the simulation of worst-case conditions to provide an estimate of device performance and reliability when misused in a clinical setting. This data was used to determine the suitability of the device for clinical trials. The materials required appear in Table III and the fabrication process for the tissue analog materials appears in Table IV.

TABLE III

Materials and devices used in simulation example.

| Device or Material Used | Quantity | Device Code |
|---|---|---|
| Balloon Guidewire | 13 | 1 |
| Guidewire Exchange Catheter | 13 | 2 |
| AVE GT1 Floppy Guidewire | 1 | 3 |
| AVE Microstent II Stent Catheter | 1 | 4 |
| ACS RX Multilink Stent Catheter | 1 | 5 |
| Scimed Niron Ranger Stent Catheter | 1 | 6 |
| Scimed Magic Wallstent Stent Catheter | 1 | 7 |
| Hotplate Stirrer | 1 | — |
| Animal Replacement Model | 1 | — |
| Dimethyl Sulfoxide | A/R | — |
| Polyvinyl Alcohol ($M_w$ = 130k-150k) | A/R | Completely hydrolysed |

TABLE IV

Fabrication process tabulation for poly(vinyl alcohol) hydrogel tissue analogs. PVA (99% minimum degree of hydrolysis, 100,000 minimum $M_w$) and DMSO (dimethyl sulfoxide) are used as received. Water is distilled or purified prior to use. The resulting syrup may be cast immediately or stored indefinitely at room temperature.

| Step | Directions |
|---|---|
| 1 | Clean a 1.5 inch diameter glass or plastic mold (culture plate) with ethanol and place on a level surface. |
| 2 | Determine the quantities of reagent required. An 8% PVA solution will be prepared in a 1:1 mixed solvent. 100 grams of solution will require 8 grams of PVA, 46 grams of DMSO, and 46 grams of water. |
| 3 | Create the mixed solvent by adding equal portions of water and DMSO to a round bottom flask. Set the flask on a stirring hotplate and equilibrate to 85° C. |
| 4 | Add the PVA polymer to the flask while stirring. Solution is encouraged if the polymer is added slowly. Continue stirring until dissolution is complete. |
| 5 | After solution is achieved loosely cap the flask, reduce the temperature to 75° C., and continue stirring for a period of 6 hours. After this time the solution may be stored at room temperature for later use or reheated to 85° C. for casting. |
| 6 | Pour 7 ml of the solution into the mold and allow the casting to gel over a 24 hour period. After this time the casting may be removed and placed in a warm water bath to extract the DMSO. Once the solvent is completely removed fabrication is complete. |

Test Directions (1) Ensure that all DMSO has been removed from the PVA disc prior to use. Extraction in clean water for at least 24 hours is required to guarantee the purity of the disc.

(2) Cut a 2 inch square section off of a lint-free wipe. Wet the center of the section with a few drops of water (don't wet the edges), then tape the section to a flat surface one edge at a time. Ensure that the wipe is flat before taping down the last edge.

(3) Set up the Animal Replacement Model as shown in FIGS. 7A&B. Insert a 9F guide into the glass tube so that the tip extends 2 mm beyond the end of the tube. FIGS. 7A&B show the PVA disc secured to lab benchtop.

(4) Adjust the rotational position knob on the stand so that the angle of attack is approximately 80-85 degrees. The angle of attack is measured between the normal vector of the PVA disc surface plane and the primary axis of the glass tube.

(5) Insert a 9F guide catheter through the glass tube so that approximately 2 mm extends beyond the end of the glass tube.

(6) Place a PVA disc on the center of the lint-free wipe and position the Animal Replacement Model so that the tip of the guide catheter is centered over the disc.

(7) See FIG. 7B Adjust the vertical position knob on the ficture so that the tip of the guide catheter is approximately 1-2 mm from the surface of the disc.

(8) Fill a syringe (20 cc is greater capacity) with water and attach to the Y-branch on the guide. Close the Hemostasis valve and flood the guide so that the excess water is ejected onto the PVA disc. The disc needs to remain completely hydrated during the experiment, so each time a disc is replaced the guide must be flushed again.

(9) Each one of the devices listed in Table III will be placed through the guide so that it impacts the surface of the PVA disc. No more than 8 inches of each device will be passed out of the distal end of the guide and only one pass will be performed.

(10) After completion of all testing each PVA disc will be graded subjectively following the scorecard descibed in Table V. Blot water off of the disc prior to inspection so that the surface may be better visualized.

(11) Inspect each disc and record results in Table VI. Scores midway between those descibed in the table are permissible.

TABLE V

Scoring formula for visual damage to Animal Replacement Model disc.

| Grade | Comments |
| --- | --- |
| 0 | No visible damage |
| 1 | Visible mark on surface |
| 2 | Compression marks or skipping grooves |
| 3 | Deep compression or grooving |
| 4 | Tissue model perforation or tear |

TABLE VI

Individual device scores for Animal Replacement Model test.

| Code | Score |
| --- | --- |
| 1-1 | 1.0 |
| 1-2 | 0.5 |
| 1-3 | 0.0 |
| 1-4 | 0.5 |
| 1-5 | 1.0 |
| 1-6 | 0.0 |
| 1-7 | 1.0 |
| 1-8 | 0.5 |
| 1-9 | 1.0 |
| 1-10 | 0.0 |
| 1-11 | 0.5 |
| 1-12 | 0.0 |
| 1-13 | 0.5 |
| 2-1 | 1.0 |
| 2-2 | 1.0 |
| 2-3 | 2.0 |
| 2-4 | 1.5 |
| 2-5 | 1.5 |
| 2-6 | 1.5 |
| 2-7 | 1.0 |
| 2-8 | 0.5 |
| 2-9 | 2.0 |
| 2-10 | 1.0 |
| 2-11 | 2.5 |
| 2-12 | 1.0 |
| 2-13 | 1.5 |
| 3 | 0.5 |
| 4 | 2.5 |
| 5 | 1.0 |
| 6 | 1.5 |
| 7 | 1.0 |

TABLE VII

Summary of device scores for Animal Replacement Model test.

| Code | Device | Mean | Std Dev |
| --- | --- | --- | --- |
| 1 | Balloon Guidewire | 0.43 | 0.44 |
| 2 | Guidewire Exchange Catheter | 1.38 | 0.54 |
| 3 | AVE GT1 Floppy Guidewire | 0.5 | — |
| 4 | AVE Microstent II Stent Catheter | 2.5 | — |
| 5 | ACS RX Multilink Stent Catheter | 1.0 | — |
| 6 | Scimed Niron Ranger Stent Catheter | 1.5 | — |
| 7 | Scimed Magic Wallstent Stent Catheter | 1.0 | — |

Discussion of Results

The test plan included 13 Balloon Guidewires, 13 Guidewire Exchange Catheters, 1 standard coronary guidewire, and 4 stent catheters. The stent catheters and coronary guidewire are available commercially in the U.S, while the Balloon Guidewire has been approved for clinical trials in Europe. The Guidewire Exchange Catheter is the focus of this experiment.

The test results described in Tables VI and VII were derived from 7 different devices tested under otherwise identical conditions. In each instance the same test fixture, with identical attack angle and tip gap, was employed. The tissue analogs (PVA discs) were fabricated in a single batch and were identical. All testing was performed in a single session by one operator. It is reasonable, therefore to attribute performance differences between individual device tests to the devices themselves.

The impact of each device on the tissue analog is illustrated in FIGS. 9A-C. The guidewire (FIG. 9A) had minimal effect, leaving an impression (surface remained unbroken) approximately 0.15 mm in width. The AVE Microstent II stent catheter (FIG. 9B) penetrated the surface and left a much wider 0.70 mm groove in the tissue model. The Guidewire Exchange Catheter (FIG. 9C) skipped along the surface of the model and created impressions that were as wide as 0.75 mm in some places. Referring to Table VII it may be seen that the mean damage score (n=13) for the Balloon Guidewire was less than 0.5, which corresponds to the creation of very minor, transient impressions in the model. The score range was 0.0-1.0.

The mean score attributed to the Guidewire Exchange Catheter was less than 1.5, which corresponds to visible impressions, which may or may not result from penetration of the surface. Closer inspection of the individual data points reveals that the surface was actually compromised (range was 0.5-2.5) in less than a third of the specimens.

The scores attributed to the various stent catheters range between 1.0 and 2.5, with a median value of 2.0. In fact, the worst damage caused by the stent catheter group was the 2.5 score attributed to the AVE Microstent II, which was equaled in only one instance by the Guidwire Exchange Catheter in 13 repetitions.

The scores achieved by the Guidewire Exchange Catheter were lower than the median stent catheter value in 10 of the 13 trials. This data supports the argument that the use of the Guidewire Exchange Catheter is no more likely to cause injury in actual clinical use than other devices commercially available in the U.S.

Finally, while various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims. The teachings of all patents and other references cited herein are incorporated herein by reference to the extent they are not inconsistent with the teachings herein.

What is claimed is:

1. An artificial anatomic model configured to geometrically mimic a lumen possessing human or nonhuman animal anatomic structure, said model comprising:

a luminal structure comprised of, in part, or in whole, a hydrogel, said luminal structure simulating tensile modulus and shear strength of a human or nonhuman animal vein or artery with fifty percent or more similarity, and comprising an inner luminal surface simulating a coefficient of dynamic friction of a human or nonhuman animal vein or artery tunica intima inner surface with fifty percent or more similarity; and artificial support tissue cooperative with said luminal structure and comprised of an analog material.

2. The artificial anatomic model of claim 1, wherein said artificial support tissue is comprised of at least one analog material selected from the group consisting of hydrogel, silicone rubber, natural rubber, other thermosetting elastomers, other thermoplastic elastomers, acrylic polymers, other plastics, ceramics, cements, wood, styrofoam, metals, actual human tissues, actual animal tissues, and any combination thereof.

3. The artificial anatomic model of claim 1, wherein said artificial support tissue is designed to simulate at least one predetermined physical characteristic of skin, muscle, bone, fat, skin, or connective tissue.

4. The artificial anatomic model of claim 1, wherein said artery comprises a femoral artery.

5. The artificial anatomic model of claim 4, wherein said artificial support structure comprises a material analog simulating muscle and geometrically mimicking a portion of a human thigh.

6. The artificial anatomic model of claim 1, wherein said vasculature comprises a thoracic aorta.

7. The artificial anatomic model of claim 1, wherein said artificial support tissue is dissociable from said luminal structure.

8. A model designed for testing a medical device, said model comprising:

an artificial anatomic structure geometrically mimicking a human or animal anatomic structure; and analog material employed by said artificial anatomic structure simulating at least one predetermined physical characteristic of a target tissue; wherein said artificial anatomical structure geometrically mimics vasculature, and further comprises:

artificial support tissue;

a luminal structure comprised of, in part, or in whole, a hydrogel, said luminal structure simulating tensile modulus and shear strength of a human or nonhuman animal vein or artery with fifty percent or more similarity, and comprising an inner luminal surface simulating a coefficient of dynamic friction of a human or nonhuman animal vein or artery tunica intima inner luminal surface with fifty percent or more similarity;

a liquid reservoir adapted to hold a liquid; and a pump in fluid communication with said luminal structure, said pump causing a pulsed or continuous liquid circulation, said pump circulating said liquid from said reservoir through said lununal structure.

9. The model of claim 8 wherein said luminal structure further comprises a second analog material disposed along an outer surface of said vessel, said second analog material comprised of a structural integrity simulating predetermined characteristics of an outer surface of said vasculature.

10. The model of claim 8, wherein said luminal structure comprises a portion having an enlarged diameter simulating an aneurysm.

11. The model of claim 8, wherein said luminal structure comprises a portion defining a restriction simulating a stenosis.

12. The model of claim 8, wherein said luminal structure comprises a portion simulating an arteriovenous malformation or tumor.

13. The model of claim 8, wherein said liquid comprises a color simulating an appearance of blood.

* * * * *